UNITED STATES PATENT OFFICE.

FRANZ MEYER, OF UERDINGEN-ON-THE-RHINE, GERMANY, ASSIGNOR TO THE FIRM OF R. WEDEKIND & CO. M. B. H., OF UERDINGEN-ON-THE-RHINE, GERMANY.

PROCESS OF MAKING SULFUR DIOXID.

1,008,847.     Specification of Letters Patent.     Patented Nov. 14, 1911.

No Drawing.     Application filed September 8, 1910. Serial No. 580,952.

*To all whom it may concern:*

Be it known that I, FRANZ MEYER, a subject of the German Emperor, and residing at Uerdingen-on-the-Rhine, whose post-office address is 2 Augustastrasse, Uerdingen-on-the-Rhine, Germany, have invented certain new and useful Improvements in Processes for the Utilization of the Sulfur Contained in Sulfates, Especially in Calcium Sulfate; and I do hereby declare the following to be a full, clear, and exact description of the invention, such as will enable others skilled in the art to which it appertains to make and use the same.

It has been repeatedly recommended (Tray, *Zeitschrift für angewandte Chemie* 1909, page 2375) that the sulfur contained in gypsum be utilized for the production of sulfuric acid by decomposing the gypsum with silica (sand) in heated retorts or muffle furnaces. Apparently these proposals have so far not found any practical application, probably for the reason, that the decomposition requires a comparatively large amount of fuel. It is therefore cheaper to generate gases containing the sulfur dioxid required for the manufacture of sulfuric acid or for other purposes, by roasting pyrites and other sulfids, although the two raw materials, gypsum and sand, are very common and easily obtainable. I have discovered, that the decomposition of gypsum with sand is economically accomplished by roasting a mixture of the two raw materials with pyrites, the latter being present in such quantity that the exothermic heat generated by roasting the latter furnishes the heat necessary for the decomposition of gypsum with silica. In this manner, not only is the fuel otherwise required for the decomposition saved, but also the roasting can be carried out in an apparatus such as used for roasting galena and copper sulfids, and in which the air passes through the charge, as *e. g.* in the Huntington-Heberlein converters or in the Dwight-Lloyd roasting machines, which, as is well known, are worked at a very low cost. The roasting of pyrites ore which is rich in sulfur, has so far not been practically possible in this kind of roasters, inasmuch as iron monosulfid (FeS) is formed and having a low fusing temperature, melts and thus prevents or at least handicaps the passage of the air through the charge. By roasting pyrites with gypsum and sand admixed this difficulty is overcome.

The process is of special interest to chemical works in which sulfuric acid is manufactured from pyrites gases and in which is simultaneously obtained calcium sulfate as a by-product *e. g.* by neutralizing sulfuric acid with lime, an operation quite frequent in chemical works.

Example: Wet filter cakes of calcium sulfate corresponding to 5 lbs. of $CaSO_4.2aq.$ were intimately mixed with 2 lbs. of sand and 3 lbs. of Spanish pyrites fines and dried. The dry cake was broken up into small lumps, which were charged into a converter upon a layer of ignited charcoal placed on the grate, while air was blown into the converter underneath the grate. The contents of the converter gradually took fire and after a while they were glowing vividly and developing large quantities of gases containing sulfur dioxid.

The gypsum can of course be replaced by other sulfates as *e. g.* heavy spar, where this raw material can be had advantageously, or by a mixture of various sulfates.

I claim as my invention:—

1. The process of producing sulfur dioxid which consists in heating a mixture of gypsum, silica and pyrites, the latter being present in such quantity as to furnish, by exothermic reaction, the heat necessary for the decomposition of the gypsum with silica and bringing a gas containing oxygen into contact with the mixture after the latter has been ignited.

2. The process of producing sulfur dioxid which consists in heating a mixture of calcium sulfate, silica and pyrites, the latter being present in such quantity as to furnish, by exothermic reaction, the heat necessary for the decomposition of the sulfate with silica, and bringing a gas containing oxygen into contact with the mixture after the latter has been ignited.

In testimony whereof I have signed my name to this specification, in the presence of two subscribing witnesses.

FRANZ MEYER.

Witnesses:
   V. S. HALL,
   HENRY CUSEDFLUG.